United States Patent
Huang et al.

(10) Patent No.: US 6,940,738 B2
(45) Date of Patent: Sep. 6, 2005

(54) SYNCHRONOUS RECTIFIER

(75) Inventors: Chia-Hsiong Huang, Tao-Yuan Hsien (TW); Lian-Liang Yang, Tao-Yuan Hsien (TW); Tian-Chang Lin, Tao-Yuan Hsien (TW)

(73) Assignee: Delta Electronics, Inc., Tao-Yuan (TW)

( * ) Notice: Subject to any disclaimer, the term of this patent is extended or adjusted under 35 U.S.C. 154(b) by 103 days.

(21) Appl. No.: 10/611,197

(22) Filed: Jul. 1, 2003

(65) Prior Publication Data
US 2004/0052100 A1 Mar. 18, 2004

(30) Foreign Application Priority Data

Jul. 4, 2002 (TW) ........................................ 91114874 A (51) Int. Cl.[7] ........................ H02M 2/217; H02M 3/335
(52) U.S. Cl. ............................ 363/127; 363/17; 363/89
(58) Field of Search ........................... 363/127, 17, 89, 363/132, 16, 95, 131, 125; 323/282, 283, 222, 284

(56) References Cited

U.S. PATENT DOCUMENTS 6,151,233 A * 11/2000 Kondo ........................ 363/125
6,504,739 B2 * 1/2003 Phadke ....................... 363/127

* cited by examiner

*Primary Examiner*—Rajnikant B. Patel
(74) *Attorney, Agent, or Firm*—Volpe and Koenig, P.C.

(57) ABSTRACT

A synchronous rectifier, comprising an input unit outputting a process signal in response to an AC input signal, a control unit electrically connected to the input unit and including a pulse-time control circuit, producing a first driving signal and a second driving signal, and an output unit electrically connected to the input unit and the control unit. And the output unit has a first switch control circuit and a second switch control circuit in response to the first driving signal and the second driving signal respectively for transforming the process signal into an output signal while the first switch control circuit and the second switch control circuit are free for a cross conduction.

32 Claims, 6 Drawing Sheets

SYNCHRONOUS RECTIFIER

FIELD OF THE INVENTION

The present invention relates to a synchronous rectifier, and more particularly, to a synchronous rectifier utilizing a transformer to drive synchronous rectifying transistors.

BACKGROUND OF THE INVENTION

Figure 1:
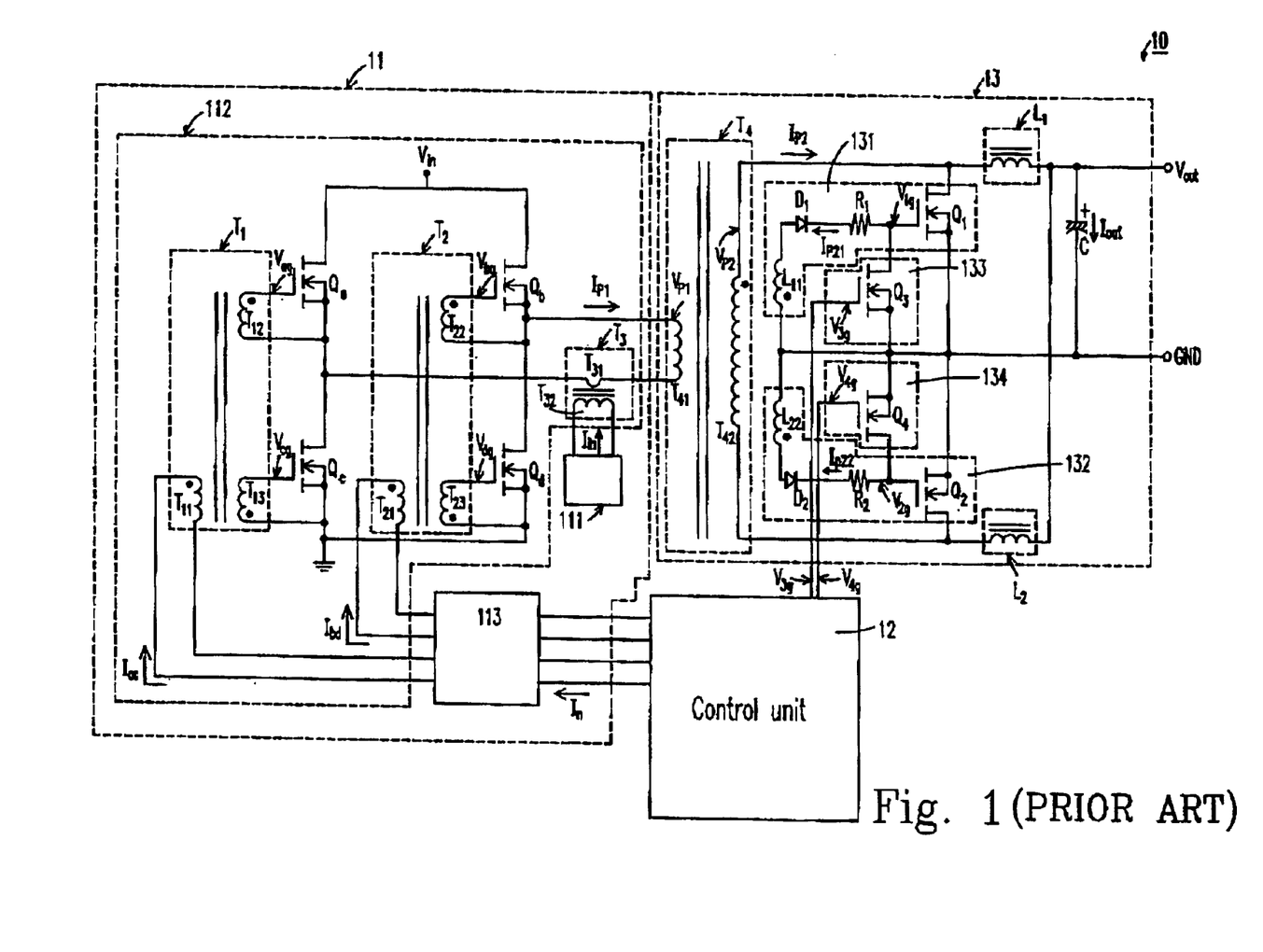
FIG. 1 is a schematic view showing block structure diagram of the conventional synchronous rectifier.

In present power supply products, the synchronous rectifier often utilizes a transformer to drive synchronous rectifying transistors for achieving efficient rectifying operation. As shown in the FIG. 1, it is a schematic diagram of a conventional synchronous rectifier 10. In FIG. 1, the synchronous rectifier 10 includes: a input unit 11, a control unit 12 and an output unit 13. Meanwhile, the input unit 11 further includes a signal detecting circuit 111, a rectifying circuit 112, a signal amplified circuit 113, a first transformer T1, a second transformer T2, a third transformer T3 and a bridge rectifying circuit constructed by four transistors, Qa, Qb, Qc and Qd. Furthermore, the output unit 13 includes a first rectifying inductor L1, a second rectifying inductor L2, a rectifying capacitor C, a fourth transformer T4, a first and a second switch control circuit 131, 132, and a third and a fourth switch circuit 133, 134. Of course, in the first switch control circuit 131 further includes a transistor Q1, a first diode D1, a first resistor R1, and a first induction coil L11. And the second switch control circuit 132 further includes a transistor Q2, a second diode D2, a second resistor R2, and a second coil L22. And then the third and the fourth switch control circuits 133, 134 can be a transistor Q3 and Q4. The first transformer T1 further includes a first side coil T11, and a second side coils T12, T13. And the second transformer T2 further includes a second side coil T21, and a second side coils T22, T23. Besides, the third transformer T3 includes a first side coil T31 and a second side coil T32. And the fourth transformer T4 includes a first side coil T41 and a second side coil T42. The theory and the drawbacks of the conventional synchronous rectifier now represent as below.

After an AC input current Iin detected by the detecting circuit 111, then the AC input current Iin is transformed to the second coil T32 through the first side coil T31 of the third transformer T3. Meanwhile, the control unit 12 produces a rectifying control signal In to the input unit 11 to control the conducting sequences of the transistor Qa, Qb, Qc and Qd, and to proceed the power transmission. The rectifying control signal In is amplified by the signal amplifying circuit 113 and then have a control signal Iac and Ibd.

Because the control signal Iac is transformed to the second coil T12 and T13 through the first coil T11 of the first transformer T1, the gate electrode of the transistors Qa and Qc, which are electrically connected to the second side coil T12 and T13, can generate a gate voltage Vag and a gate voltage Vcg. Therefore, the control signal Iac can control the transistors Qa and Qc to be in a turn on state or a turn off state. By the same reason, the control signal Ibd can make the transistor Qb and Qd to generate a gate voltage Vbg and a gate voltage Vdg on the gate electrodes thereof through the second transformer T2. And make the transistor Qb and Qd to be in a turn on state or a turn off state. Therefore, by the bridge switch circuit consisted of the four transistors Qa, Qb, Qc and Qd, the direct input current Vin can be transformed to the output unit 13 through the fourth transformer T4.

Furthermore, the current signal Ip1 and the voltage signal Vp1 are inputted into the fourth transformer T4 of the output unit 13, and then be transformed by the first side coil T41 of the fourth transformer T4, and then the second side coil T42 produces another one current signal Ip2 and voltage signal Vp2. The first and second switch control circuits 131, 132 are electrically connect to the second side coil T42. So that the first induction coil L11 of the first switch control circuit 131 can produce a current Ip21 according to the current signal Ip2. Besides, the transistor Q1's gate electrode forms a gate voltage V1g to control the transistor Q1 in the turn on or the turn off state. Of course, according to the current signal Ip2, the second induction coil L22 of the second switch control circuit 132 can produce a induction current Ip22. And the transistor Q2's gate electrode forms a gate voltage V2g to control the transistor Q2 to be turned on or turned off.

So, depends on the switching between the turned-on states and the turned-off states of the transistors Q1 and Q2, and co-operates with the first and second rectifying inductors L1 and L2, the rectifying action of the rectifying capacitor C can transform the current signal Ip2 into a rectifying output signal for outputting itself. Certainly, the rectifying output signal includes a rectifying output current Iout and a rectifying output voltage Vout.

According to the above explanation, the conventional synchronous rectifier's 10 control scheme, which is for controlling the conduction state of the transistors Q1 and Q2, is mainly depended on the induction currents Ip21 and Ip2 produced by the first and second induction coils L11, L23, and depended on the gate voltages V1g, V2g formed in the transistor Q1, Q2, to drive the transistors Q1 and Q2. However, by the restriction of the leaking induction phenomenon, the conventional synchronous rectifier 10 is can't constructs an accurate driving control signal, e.g. the gate voltages V1g, V2g. Therefore, the goodwill for raising the efficiency of rectifying is not so well as the prediction of the conventional synchronous rectifier 10.

Figure 2A:
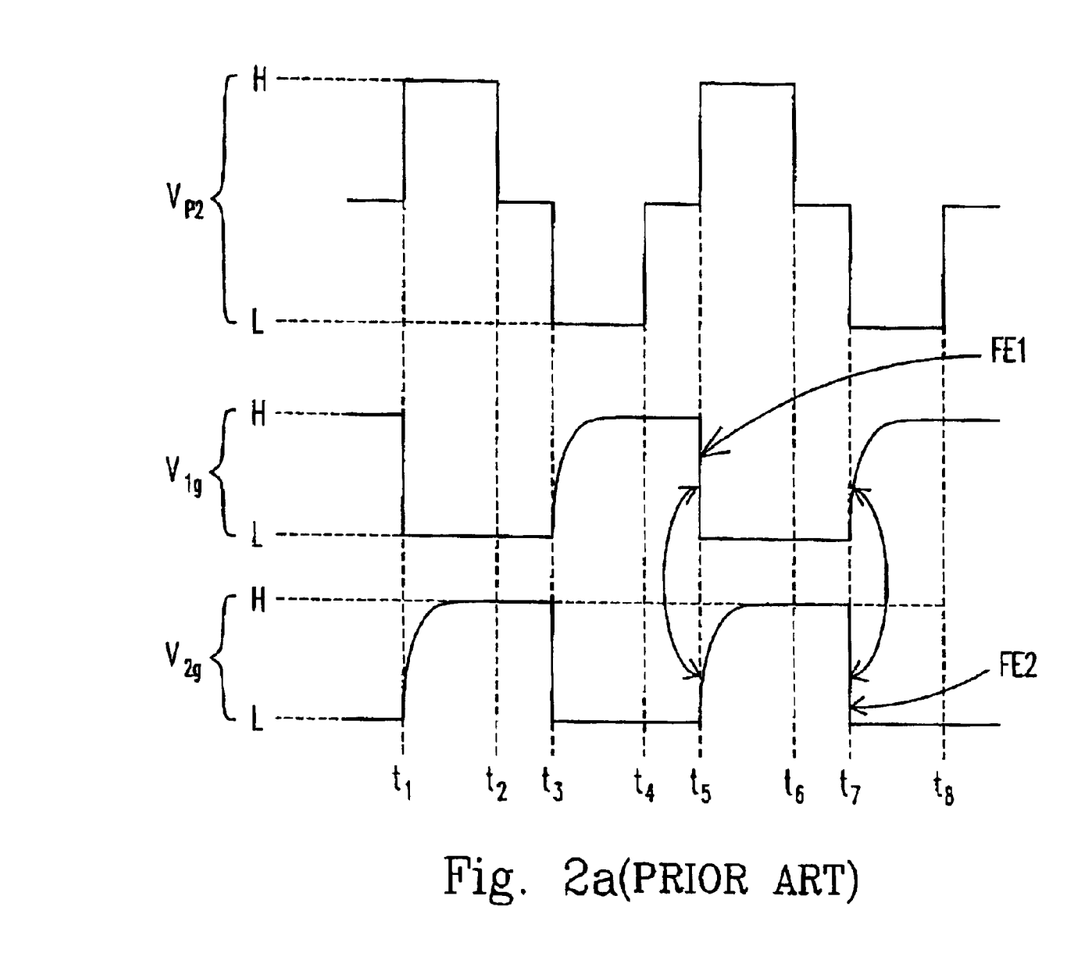
FIG. 2(a) is a wave diagram showing the wave form of the driving control signal of the switch control circuits of the conventional synchronous rectifier.

Furthermore, please refer to the FIG. 2(a), which is the wave form drawing of the driving control signal of the conventional synchronous rectifier 10 for controlling the first and second switch control circuits 131, 132. The FIG. 2(a) includes the wave forms of the gate voltages V1g, V2g for driving the transistors Q1, Q2, and the wave form of the voltage signal Vp2, which is transformed form the voltage signal Vp1 by the first side coil T41 of the fourth transformer T4, and then form in the second side coil T42. It is obviously that the gate voltages V1g, V2g can change its level follow the exchanges between the high level H and the low level L of the voltage signal Vp2. Furthermore, FIG. 2(a) shows the transient response of the gate voltages V1g, V2g in different times t1~t8. But, according to the FE1 which represents the falling edge waveform of the gate voltage V1g in time t5 and the FE2 which represents the falling edge waveform of the gate voltage V2g in time t7, it can be understood that while the gate voltage V1g is from a high level H to a low level L, the gate voltage V2g varies at the same time. However, because of the leaking induction phenomenon, the gate voltage V2g should passes a raising period that it can completes a transformation from a low level L to a high level H. By the same reason, while the gate voltage V2g is from a high level H to a low level L, the gate voltage V1g should passes a raising period that it can completes a transformation from a low level L to a high level H. Therefore, the transistors Q1, Q2 is controlled by the gate voltages V1g, V2g so that the cross conduction phenomenon is hard to overcome.

Figure 2B:
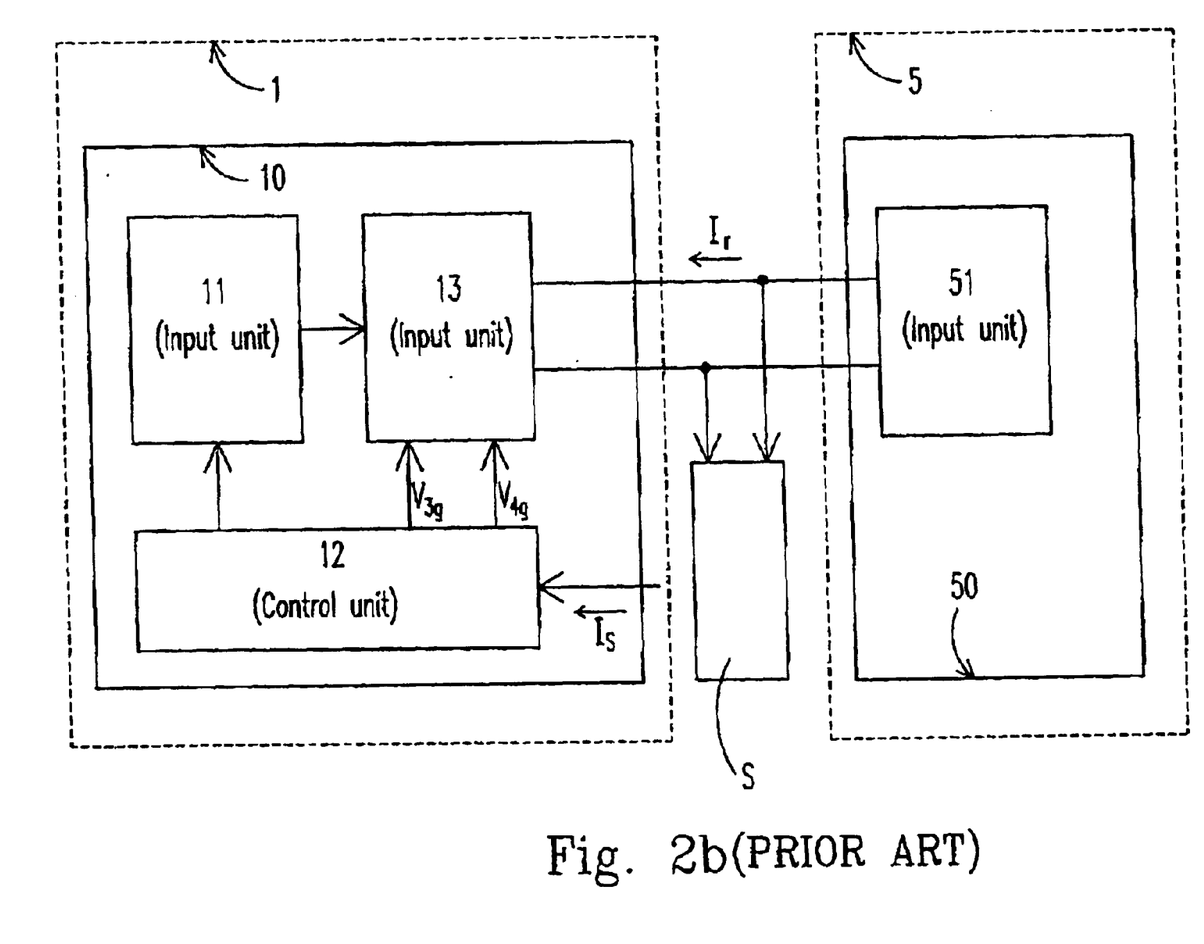
FIG. 2(b) is a schematic view showing the conventional synchronous rectifier is parallel connecting to another synchronous rectifier.

And in the FIG. 1, the functions of the third, fourth switch control circuits 133, 134, which are individually connect to the gate electrodes of transistors Q1, Q2, should cooperate with the FIG. 2(b) which shows the conventional synchronous rectifier 10 electrically connected to another synchronous rectifier 50. In the FIG. 2(b) the conventional synchronous rectifier 10 is parallelly connected to another power supply 5. It is often to provide a output current detector S connected to a common output terminal of the power supplies 1 and 5, for preventing a reverse current Ir, which is produced by the input unit 51 of the synchronous rectifier 50, passing the aforesaid parallel connection to destroy the power supply 1 or make it malfunction. While the output current detector S detects the reverse current Ir, the output current detector S creates a sensing signal Is to the control unit 12 of the synchronous rectifier 10, and then the control unit 12 produces a voltage signals V3g and V4g, and separately sends the voltage signal V3g and V4g to the gate electrode of the transistors Q3 and Q4. So the transistors Q1 and Q2 can be forced to cut off the connection with the transistors Q3 and Q4 for preventing the power supply 1 from being destroyed by the reverse current Ir.

However, the weakness of the prior art is that although the output current detector S connect with the output terminal of the synchronous rectifier 10 can solve the problem from the reverse current Ir, but the electric power loss will increase when the electric load getting high. So, the prior art cannot really effectiveness to increase the transportation efficiency of the electric power.

SUMMARY OF THE INVENTION

It is therefore an object of the present invention to provide a synchronous rectifier which can solve the cross conduction problem.

It is another object of the present invention to provide a synchronous rectifier preventing the reverse current to destroy the power supply in the parallel connection without increasing the power loss.

According to as aspect embodiment of the present invention, a synchronous rectifier includes an input unit outputting a process signal in response to an AC input signal, a control unit electrically connected to the input unit and including a pulse-time control circuit for producing a first driving signal and a second driving signal, and an output unit electrically connected to the input unit and the control unit, and having a first switch control circuit and a second switch control circuit in response to the first driving signal and the second driving signal respectively for transforming the process signal into an output signal while the first switch control circuit and the second switch control circuit are free for a cross conduction.

Preferably, the input unit further includes a signal detecting circuit for detecting and inputting the AC input signal, and a rectifying circuit electrically connected to the signal detecting circuit and the control unit for rectifying the AC input signal in response to a rectifying signal from the control unit so as to output the process signal.

Preferably, the signal detecting circuit is a current detecting circuit

Preferably, the rectifying circuit includes a plurality transformer and a plurality of transistors.

Preferably, the rectifying circuit includes a first, a second and a third transformer, and a bridge rectifier having four transistors.

Preferably, the first and the second transformer transfers the rectifying signal to a gate terminal of the four transistors for producing a gate control voltage.

Preferably, the third transformer transforms the AC input signal to the rectifying circuit.

Preferably, the four transistors are MOSFETs.

Preferably, the input unit further includes a signal amplifying circuit electrically connected to the control unit and the rectifying circuit for amplifying and outputting the rectifying signal to the rectifying circuit.

Preferably, the signal amplifying circuit is a current amplifier.

Preferably, the pulse time control circuit includes a pulse width modulator and an adjustable time-pushing circuit.

Preferably, the adjustable time-pushing circuit cooperates with the pulse width modulator to produce the first and the second drive signals, and the rectifying signal, and adjusts and sets periods of the first and the second pulse time.

Preferably, the control circuit further comprises a signal cut-off circuit electrically connected to the signal detecting circuit and the pulse time control circuit for producing the first and the second drive signals in response to the AC input signal in a specific signal state, thereby the first and the second switch control circuits both being introduced to a cut-off state for preventing the synchronous rectifier from an external signal.

Preferably, the signal cut-off circuit is a low current cut-off circuit.

Preferably, the low current cut-off circuit comprises plural voltage comparators.

Preferably, the specific signal state is a low current state.

Preferably, the external signal is an inversed current produced by an dditional synchronous rectifier parallelly connected to the synchronous rectifier.

Preferably, the first and the second switch control circuits are MOSFETs.

Preferably, the first and the second drive signals are respectively inputted into gates of the first and the second MOSFETs for producing gate control voltages.

Preferably, the output unit further comprises a first filtering inductor circuit and a second wave filtering inductor circuits individually connected to drain terminals of the first and the second MOSFETs and a filtering capacitor circuit electrically connected to the first and the second filtering inductor circuits, and source terminals of the first and the second MOSFETs, wherein the first and the second filtering inductor circuits and the filtering capacitor circuit rectify and transform the process signal into the output signal in response to the conducted state and the non-conducted state of the first and the second MOSFETs.

Preferably, the first and the second filtering inductor circuits are filtering inductors.

Preferably, the wave filter capacitor circuit is a wave filter capacitor.

Preferably, the output unit further comprises a fourth transformer electrically connected to the rectifying circuit, and the first and the second MOSFETs for transforming the process signal to the drain terminals of the first and the second MOSFETs.

Preferably, the first driving signal and the second driving signal both have a first and a second state.

Preferably, the second driving signal is retained in the second state for a period of a first pulse time and then transformed into the first state while the first driving signal is transformed from the first state into the second state.

Preferably, the first driving signal is retained in the second state for a period of a first pulse time and then transformed into the first state while the first driving signal is transformed from the first state into the second state.

Preferably, the first state is a high level and the second state is a low level.

Preferably, the first state is a low level and the second state is a high level.

Preferably, while the process signal is in the first state, the first driving signal is in the second state and the second driving signal is in the first state Preferably, while the process signal is in the second state, the first driving signal is in the first state and the second driving signal is in the second state.

Preferably, the first switch control circuit is set in one of a conducted state and a non-conducted state according to one of the first state and the second state of the second driving signal.

Preferably, the second switch control circuit is set in one of a conducted state and a non-conducted state according to one of the first state and the second state of the first driving signal.

According to another preferred embodiment of the present invention, a synchronous rectifier, comprising an input unit outputting a process signal in response to an AC input signal, a control unit electrically connected to the input unit and including a pulse-time control circuit, producing a first driving signal and a second driving signal, and an output unit electrically connected to the input unit and the control unit, and having a first switch control circuit and a second switch control circuit in response to the first driving signal and the second driving signal respectively for transforming the process signal into an output signal while the first switch control circuit and the second switch control circuit are free for a cross conduction, wherein the input unit further comprises a signal detecting circuit for detecting and inputting the AC input signal, and a rectifying circuit electrically connected to the signal detecting circuit and the control unit for rectifying the AC input signal in response to a rectifying signal from the control unit, so as to output the process signal.

The foregoing and other features and advantages of the present invention will be more clearly understood through the following descriptions with reference to the drawings, wherein:

DETAILED DESCRIPTION OF THE PREFERRED EMBODIMENT

Figure 3:
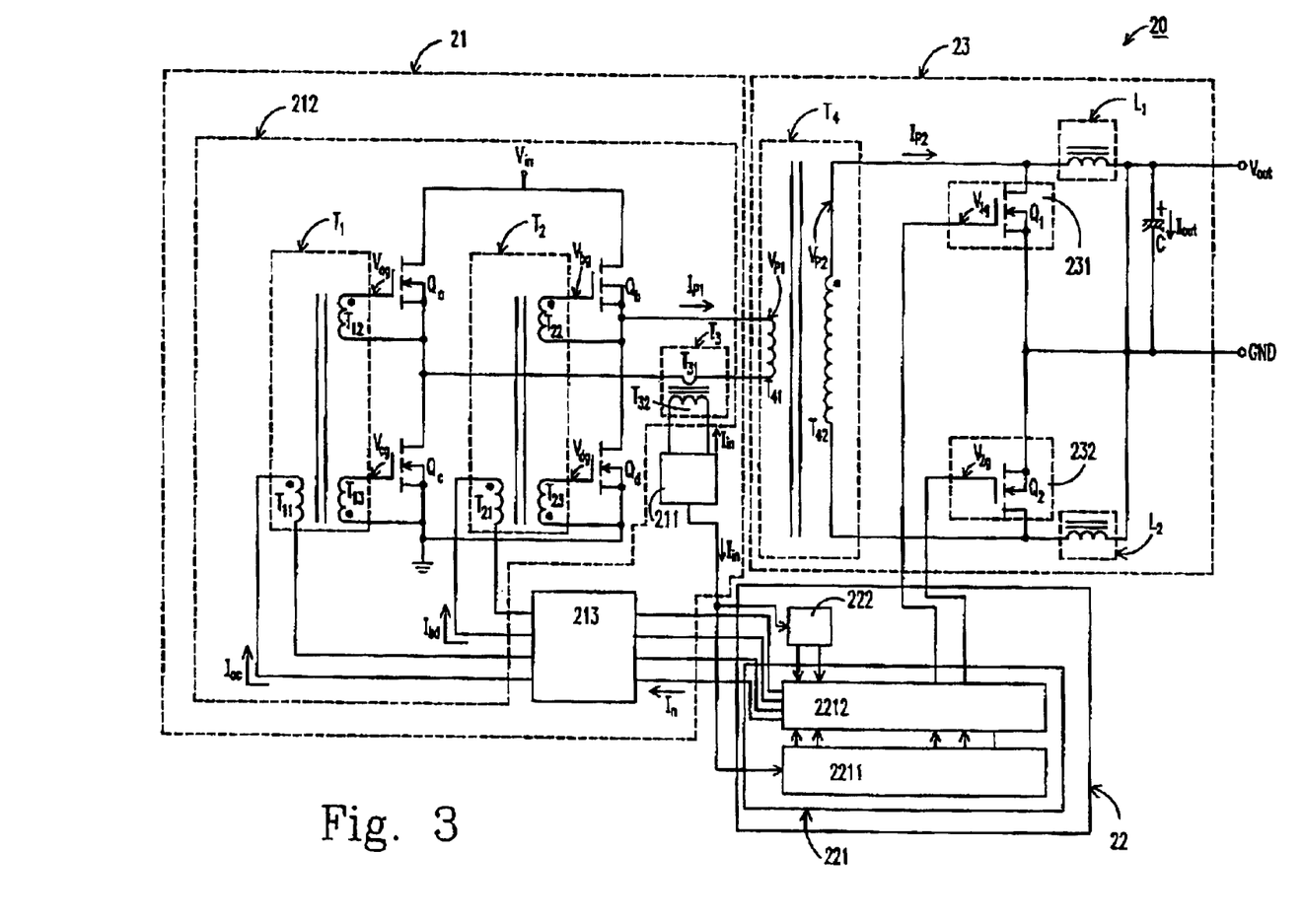
FIG. 3 is a schematic view showing block structure diagram of the preferred embodiment of the synchronous rectifier of the present invention.

The present invention will now described more specifically with reference to the following embodiments. Please refer to FIG. 3. FIG. 3 shows the block structure according to a preferred embodiment of the present invention. It shows clearly in the drawing that the present invention's synchronous rectifier 20 has an input unit 21, a control unit 22 and an output unit 23. The input unit 21 includes a signal detecting circuit 211, a rectifying circuit 212, signal amplifying circuit 213, a first transformer T1, a second transformer T2, a third transformer T3 and a bridge rectifier having four transistors Qa, Qb, Qc and Qd. And, the output unit 13 includes a first filtering inductor circuit L1 (ex: a first filtering inductor), a second filtering inductor circuit L2 (ex: a second filtering inductor), and a filtering capacitor circuit C, a fourth transformer unit T4, a first and a second switch control circuits 131,132. Certainly, the first switch control circuit can be a transistor Q1, and the second switch control circuit can be a transistor Q2. The transistors Q1 and Q2 can be MOSFETs.

The control unit 22 includes a pulse-time control circuit 221 and a signal cut-off circuit 222. And the pulse-time control circuit 221 further comprises a pulse width modulation 2211 (PWM) and an adjustable time-pushing circuit 2212. Because of respecting an alternative input current Iin, the pulse-time control circuit 221 can produce a first and a second driving signals V1g and V2g inputted individually to the gate electrodes of the transistors Q1 and Q2. And the signal cut-off circuit 222 can also produce the first and the second driving signals V1g and V2g because of respecting the alternative input current Iin thereby.

Besides, the first transformer T1 further includes a first side coil T11 and two second side coils T12, T13. And the second transformer T2 has a first side coil T21 and two second side coils T22, T23. Furthermore, the third transformer T3 includes a first side coil T31 and a second side coil T32. And the fourth transformer T4 includes a first side coil T41 and a second side coil T42.

The working theory of the embodiment in the FIG. 3 now will be explained as hereafter. The signal detecting circuit 211 can make the alternative input signal Iin inputted therein be transformed by the first side coil T31 of the third transformer T3, to the second side coil T32. Meanwhile, the control unit 22 produces the rectifying signal In to the input unit 21 to make the transistors Qa, Qb, Qc and Qd rectifying the AC input signal Iin. Wherein, the rectifying signal In will include a control signal Iac and Ibd after be amplified by the signal amplifying circuit 213.

Because, the control signal Iac is transformed to the second side coils T12, T13 by the first side coil T11 of the transformer T1, the gate electrodes of the transistors Qa, Qc, which electrical connect to the second side coils T12, T13, can individually form a gate voltages Vag and Vcg. Therefore, the control signal Iac can control the transistors Qa and Qc in the conducted state or a non-conducted state. By the same reasons, through the second transformer T2, the control signal can individually produces gate voltages Vbg, Vdg on the gate electrodes of the transistors Qb and Qd, and then makes the transistors Qb and Qd in the conducted state or the non-conducted state. So, by the bridge rectifying circuit constructed by the four transistors Qa, Qb, Qc and Qd, the alternative input signal Iin can be rectified, and then includes a current signal Ip1 and voltage signal Vp1, then be outputted to the output unit 23.

The current signal Ip1 is outputted into the fourth transformer T4 of the output unit 23. Through the transformation of the first side coil T41 of the fourth transformer T4, the second side coil T42 occurs another one current signal Ip2 and one voltage signal Vp2. Besides, through the first and the second driving signal V1g and V2g produced by the control unit 23, the transistors Q1 and Q2 can exchanging the conducted/non-conducted state therebetween. So, by corresponding with the rectifications of the first and the second filtering inductors L1 and L2, and the filtering capacitor C, the current signal Ip2 can be changed into a filtering output signal then be outputted. Certainly, the filtering output signal includes a filtering output current Iout and filtering output voltage Vout. Wherein, the filtering inductors L1, L2 are individual connect to the drain electrodes of the transistors Q1, Q2. And the filtering capacitor C electrically connects to the source electrodes of the first and the second filter inductors L1, L2 and transistors Q1, Q2.

According to the above explanation, the embodiment of the FIG. 3 has no similar elements like the third and fourth switch control circuit 133 and 134, the schema for controlling the transistors Q1 and Q2 in the conducted state or the non-conducted state is taken on by the control unit 22 in the present invention. So the preferred embodiment of the present invention will not occurs the unconquerable cross-conduction phenomenon like the conventional synchronous rectifier 10's control schema occurs.

Figure 4:
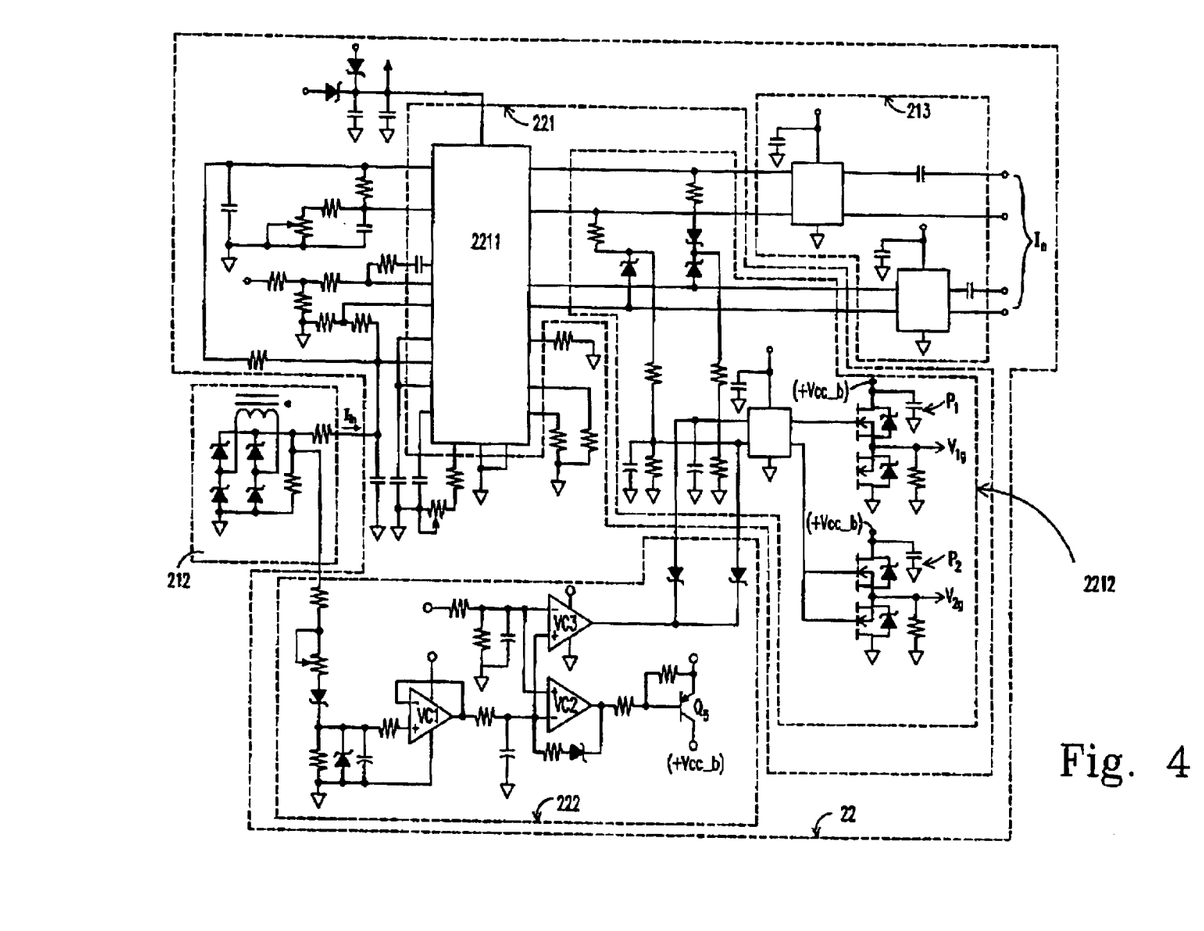
FIG. 4 is a schematic view showing the detail electrical connections between the control unit, the input unit and the output unit of a preferred embodiment of the present invention.

Please refer to the FIG. 4, it shows the detail electric structures between the control unit 22, input unit 21, and the output unit 23. In FIG. 4, the alternative input signal Iin detected by the signal detecting circuit 211 can be inputted into the PWM 2211, and by cooperating with the adjustable time-pushing circuit 2212, the PWM 2211 can produce the first and the second drive signal V1g and V2g. Of course, the driving circuits P1, P2 of the transistor Q1, Q2 of the adjustable time-pushing circuit 2212, are the driving step for producing the first and the second drive signal V1g and V2g. Besides, by changing the parameters of the PWM 2211, and the resistor value and the capacitor value of the adjustable time-pushing circuit 2212, the time sequences of the first and the second drive signal V1g and V2g can be changed respectively. Therefore, it is clear that the PWM 2211 provides a flex method to control or adjust the time sequences to the first and the second drive signal V1g and V2g.

In FIG. 4, the signal cut-off circuit 222 is provided, which includes the first, second and third voltage comparing circuits VC1, VC2 and VC3, and a transistor Q5. The first, second and third voltage comparing circuits VC1, VC2 and VC3, and a transistor Q5 produce the first and the second drive signals V1g and V2g, and to force the first and the second switch control circuit 231, 232 (FIG. 3) into a cut-off state, while the alternative input signal Iin (please refer to the FIG. 3, the first side coil T31 of the third transformer T3) is in a special state (ex: a low current state), for preventing an external signal (ex: the reverse current Ir of the FIG. 2(b)) reversal inputted from the output unit 23 and destroys synchronous rectifier 20. Furthermore, when a power supply, which has the synchronous rectifier 20, connects to another power supply which also has another synchronous rectifier, while the first and the second voltage comparing circuits VC1 and VC2 find out that the alternative input signal Iin is in a low current state, the third voltage comparing circuit VC3 produces the first and the second drive signal V1g and V2g to force the first and the second switch control circuit 231, 232 to cut-off, for preventing the invasion of the reverse current Ir. On the other sides, for conforming that the first and the second switch control circuit 231, 232 are really cut-off, the first and the second voltage comparing circuits VC1 and VC2 will cut-off the transistor Q5 when the AC input signal Iin is in the low current state. The reason is because the collector of the transistor Q5 is electrical connects with the drive control circuits P1 and P2 of the transistors Q1 and Q2 (the connection is signed as+Vcc_d). So, while the transistor Q5 is cut-off by the first and the second voltage comparing circuits VC1 and VC2, will also bring the drive control circuits P1 and P2 of the transistors Q1 and Q2 in a cut-off state. Therefore, it can be confirmed that the first and the second drive signals V1g and V2g produced by the drive control circuits P1 and P2 of the transistors Q1 and Q2, can force the first and the second switch control circuit 231, 232 in a cut-off state. Simply speaking, the present invention will not increases the electric power loss occurred by the output current detector S of the conventional synchronous rectifier 10.

Figure 5:
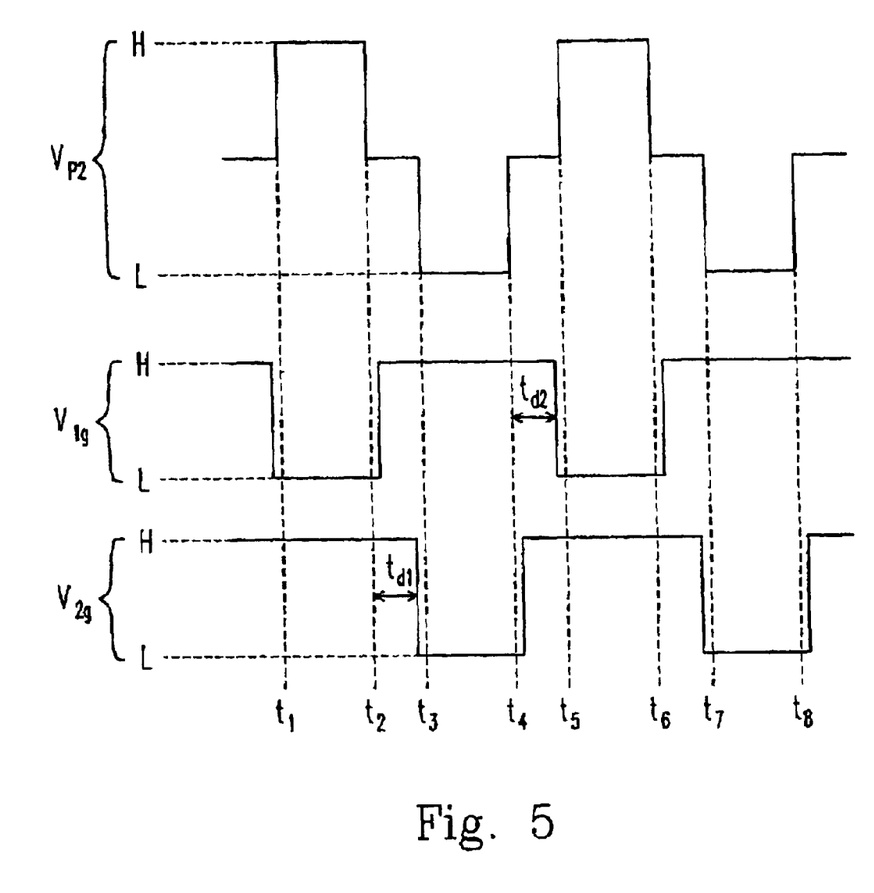
FIG. 5 is a wave diagram showing the wave forms of the first and second driving control signals of the first and second switch control circuits of a preferred embodiment of the present invention.

Besides, the control unit 22 and the output unit 23 can be used to solve the cross-conduction occurred by the conventional first and second switch control circuit 131, and 132. Please refer to the FIG. 5, showing the wave forms of the first and second driving control signals V1g and V2g of the first and second switch control circuits 231 and 232 of a preferred embodiment of the present invention. The FIG. 5 displays the wave forms of the first and second driving control signals V1g and V2g produced by the control unit 22, and the wave form of the voltage signal Vp2 which is transformed by first side coil T41 of the fourth transformer T4, and then produced at the second side coil T42. It is clearly like the FIG. 2(a), the first and second driving control signals V1g and V2g must change the electric levels thereof by following the first state (ex: a low level L) or the second state (ex: a high level H) of the voltage signal Vp2, and have different transient states at different times from t1 to t8 in the FIG. 2(a). However, the differences between the FIG. 2(a) and FIG. 5 is that the gate voltages V1g and V2g in FIG. 2(a) proceed with the transient states at the same time. Therefore, in the FIG. 1, the transistors Q1 and Q2 occur the cross conduction because influences of the gate voltages V1g and V2g. However, in the FIG. 5, the transients of the first and second driving control signals V1g and V2g do not occurr at the same time. On the contrary, during the transient state, there are time-laggings td1, td2 between the first and second driving control signals V1g and V2g. For examples, while the PWM 2211 transform the first driving control signal V1g from the fist state (a low level state L) into the second state (a high level state H), the PWM 2211 still maintains the second driving control signal V2g in the second state for the time-lagging td, and then transform the second driving control signal V2g into the first state. Or on contrary, while the PWM 2211 transform the second driving control signal V2g from the first state into the second state, the PWM 2211 still maintains the first driving control signal V1g in the second state for the time-lagging td2, and then transform the first driving control signal V1g into the first state. So, the first and the second switch control circuit 231, 232 controlled by the first and second driving control signals V1g and V2g will not occur the cross conductions.

Therefore, by the application of the disclosures of the preferred embodiments of the present invention, the cross conduction problem occurred by the conventional product. Moreover, the present invention can not only prevent the reverse current reverse flows from a output terminal of the power supplies in parallel connection to destroy the power supplies or make them to be malfunction, and but also won't increasing of the power loss. So, the present invention has a highly commercial application.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A synchronous rectifier, comprising:
   an input unit outputting an alternative input signal and a process signal in response to an AC input signal and a rectifying signal respectively;
   a control unit electrically connected to said input unit, comprising:
      a pulse-time control circuit for producing said rectifying signal, a first driving signal, and a second driving signals, comprising:
   a pulse width modulator receiving said alternative input signal; and
      an adjustable time-gushing circuit electrically connected to said pulse width modulator; and
   an output unit electrically connected to said input unit and said control unit, and having a first switch control circuit and a second switch control circuit in response to said first driving signal and said second driving signal respectively for transforming said process signal into an output signal while said first switch control circuit and said second switch control circuit are free for a cross conduction.

2. The synchronous rectifier according to claim 1, wherein said input unit further comprises:
   a signal detecting circuit for detecting and inputting said AC input signal, and generating said alternative input signal; and
   a rectifying circuit electrically connected to said signal detecting circuit and said control unit for rectifying said AC input signal in response to said rectifying signal from said control unit, so as to output said process signal.

3. The synchronous rectifier according to claim 2, wherein said signal detecting circuit is a current detecting circuit.

4. The synchronous rectifier according to claim 2, wherein said rectifying circuit includes a plurality transformer units and a plurality of transistors.

5. The synchronous rectifier according to claim 4, wherein said rectifying circuit includes a first, a second and a third transformer units, and a bridge rectifier having four transistors.

6. The synchronous rectifier according to claim 5, wherein said first and said second transformers transform said rectifying signal to a gate terminal of said four transistors for producing a gate control voltage.

7. The synchronous rectifier according to claim 5, wherein said third transformer transforms said AC input signal to said rectifying circuit.

8. The synchronous rectifier according to claim 5, wherein said four transistors are MOSFETs.

9. The synchronous rectifier according to claim 2, wherein said input unit further includes a signal amplifying circuit electrically connected to said control unit and said rectifying circuit for amplifying and outputting said rectifying signal to said rectifying circuit.

10. The synchronous rectifier according to claim 9, wherein said signal amplifying circuit is a current amplifier.

11. The synchronous rectifier according to claim 2, wherein said adjustable time-pushing circuit cooperates with said pulse width modulator to produce said first and said second driving signals, and said rectifying signal, and adjusts and sets periods of a first and a second pulse times.

12. The synchronous rectifier according to claim 2, wherein said control circuit further comprises a signal cut-off circuit electrically connected to said signal detecting circuit and said pulse time control circuit for producing said first and said second driving signals in response to said AC input signal in a specific signal state, thereby said first and said second switch control circuits both being introduced to a cut-off state for preventing said synchronous rectifier from an external signal.

13. The synchronous rectifier according to claim 12, wherein said signal cut-off circuit is a low current cut-off circuit.

14. The synchronous rectifier according to claim 13, wherein said low current cut-off circuit comprises plural voltage comparators.

15. The synchronous rectifier according to claim 12, wherein said specific signal state is a low current state.

16. The synchronous rectifier according to claim 12, wherein said external signal is an inversed current produced by an additional synchronous rectifier parallelly connected to said synchronous rectifier.

17. The synchronous rectifier according to claim 5, wherein said first and said second switch circuits are a first and a second MOSFETs respectively.

18. The synchronous rectifier according to claim 17, wherein said first and said second driving signals are respectively inputted into gates of said first and said second MOSFETs for producing gate control voltages.

19. The synchronous rectifier according to claim wherein 17, wherein said output unit further comprises:
   a first filtering inductor circuit and a second filtering inductor circuits individually connected to drain terminals of said first and said second MOSFETs; and
   a filtering capacitor circuit electrically connected to said first and said second filtering inductor circuits, and source terminals of said first and said second MOSFETs, wherein said first and said second filtering inductor circuits and said filtering capacitor circuit rectify and transform said process signal into said output signal in response to a turn on state and a turn off state of said first and said second MOSFETs.

20. The synchronous rectifier according to claim 19, wherein said first and said second filtering inductor circuits are filtering inductors.

21. The synchronous rectifier according to claim 19, wherein said filtering capacitor circuit is a wave filter capacitor.

22. The synchronous rectifier according to claim 19, wherein said output unit further comprises a fourth transformer unit electrically connected to said rectifying circuit, and said first and said second MOSFETs for transforming said process signal to said drain terminals of said first and said second MOSFETs.

23. The synchronous rectifier according to claim 1, wherein said first driving signal and said second driving signal both have a first and a second state.

24. The synchronous rectifier according to claim 23, wherein said second driving signal is retained in said second state for a period of a first pulse time and then transformed into said first state while said first driving signal is transformed from said first state into said second state.

25. The synchronous rectifier according to claim 23, wherein said first driving signal is retained in said second state for a period of a first pulse time and then transformed into said first state while said first driving signal is transformed from said first state into said second state.

26. The synchronous rectifier according to claim 23, wherein said first state is a high level and said second state is a low level.

27. The synchronous rectifier according to claim 23, wherein said first state is a low level and said second state is a high level.

28. The synchronous rectifier according to claim 23, wherein while said process signal is in said first state, said first driving signal is in said second state and said second driving signal is in said first state.

29. The synchronous rectifier according to claim 23, wherein while said process signal is in said second state, said first driving signal is in said first state and said second driving signal is in said second state.

30. The synchronous rectifier according to claim 23, wherein said first switch circuit is set in one of a conducted state and a non-conducted state according to one of said first state and said second state of said second driving signal.

31. The synchronous rectifier according to claim 23, wherein said second switch circuit is set in one of a conducted state and a non-conducted state according to one of said first state and said second state of said first driving signal.

32. A synchronous rectifier, comprising:
an input unit outputting an alternative input signal and a process signal in response to an AC input signal and a rectifying signal respectively;
a control unit electrically connected to said input unit, comprising:
a pulse-time control circuit for producing a rectifying signal, a first driving signal, and a second driving signal, comprising:
a pulse width modulator receiving said alternative input signal; and
an adjustable time-pushing circuit electrically connected to said pulse width modulator; and
an output unit electrically connected to said input unit and said control unit, and having a first switch control circuit and a second switch control circuit in response to said first driving signal and said second driving signal respectively for transforming said process signal into an output signal while said first switch control circuit and said second switch control circuit are free for a cross conduction,
wherein said input unit further comprises:
a signal detecting circuit for detecting and inputting said AC input signal, and generating said alternative input signal; and
a rectifying circuit electrically connected to said signal detecting circuit and said control unit for rectifying said AC input signal in response to said rectifying signal from said control unit, so as to output said process signal.

* * * * *

UNITED STATES PATENT AND TRADEMARK OFFICE
CERTIFICATE OF CORRECTION

PATENT NO. : 6,940,738 B2
DATED : September 6, 2005
INVENTOR(S) : Huang et al.

It is certified that error appears in the above-identified patent and that said Letters Patent is hereby corrected as shown below:

Column 6,
Line 14, after "circuits" delete "131,132" and insert -- 231,232 --.

Signed and Sealed this

Tenth Day of January, 2006

JON W. DUDAS
*Director of the United States Patent and Trademark Office*